June 30, 1942.    H. TORMYN    2,287,951

METAL ARTICLE AND METHOD OF MAKING SAME

Filed May 17, 1939

Inventor
Herman Tormyn
By Blackmore, Lowers & Flint
Attorneys

Patented June 30, 1942

2,287,951

UNITED STATES PATENT OFFICE 2,287,951

METAL ARTICLE AND METHOD OF MAKING SAME

Herman Tormyn, Detroit, Mich., assignor to General Motors Corporation, Detroit, Mich., a corporation of Delaware Application May 17, 1939, Serial No. 274,292

11 Claims. (Cl. 29—189)

This invention has to do with a method of making articles out of metal, particularly out of iron and steel, and with the articles so made.

It is common to manufacture parts by pressing them out of powdered metal and subsequently sintering the pressed shapes with or without a subsequent hot pressing. Such manufacture is restricted because the powdered metal required is quite expensive.

I have found that strong, durable articles may me made out of pieces of metal such as chips, turnings, shavings or chunks of various sizes by simply pressing the metal fragments together into approximately the shape desired and thereafter, if maximum strength is required, heating the partly formed pieces, preferably in a controlled atmosphere, to temperatures sufficient for hot pressing and thereafter pressing them to the desired final shape.

The resulting articles, whether made of iron or steel fragments, possess strength greatly in excess of that of cast iron. For example, articles thus made out of cast iron chips or fragments possess a breaking strength almost twice that of ordinary cast iron. Articles made of pieces of steel possess a breaking strength almost three times that of cast iron. They are non-porous and take a high polish. Close examination of an etched surface reveals the outlines of the chips and pieces from which the part was made, but to the casual observer the part has no different appearance than if made of steel in the ordinary manner as by forging or machining.

Articles made of cast iron fragments are of somewhat different texture and have a somewhat porous looking surface. This surface may be of advantage in providing pockets for lubricant.

I have found that it is not necessary to clean or otherwise treat the chips, turnings or other pieces of metal. They may be used just as they come off the parts being machined. However, in commercial production it may prove desirable to clean the metal before pressing.

This invention offers great possibilities for commercial use since a great many parts now made of cast iron or of steel where maximum strength is not necessary may be readily made from scrap which sells at low prices, in the neighborhood of one-half cent a pound.

Various details of the invention and modifications will be pointed out in the following specification.

Figure 1:
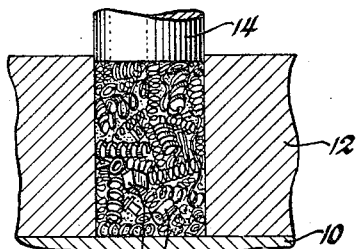
Figure 1 is a section through a portion of a press which may be used in forming simple pieces such as metal discs. The die is shown loaded with pieces of metal ready for pressing.

Referring to Figure 1, 10 indicates the base plate of a press on which is mounted the die 12 in which fits the die plunger 14. The cavity in the die 12 is filled with fragments of metal. These may consist of chips, shavings and turnings such as result from usual machining operations, such as turning, broaching and so on. With these may be mixed chunks of metal such as indicated at 18. Should the latter be more available than the usual turnings or shavings, they may be used alone. In some cases also it may be found desirable to employ a certain amount of metal powder although the work to date indicates that this is not essential. The metal should be weighed before placing it in the mold to make sure there is enough to make the desired article. It may prove desirable in practice to employ a small amount of powder so as to make it a simple matter to arrive at the exact weight of material desired.

The press employed may be of conventional hydraulic or other type. I have used with success a hydraulic press having a three second cycle of operation employing from 30 to 50 tons pressure per square inch.

Figure 2:
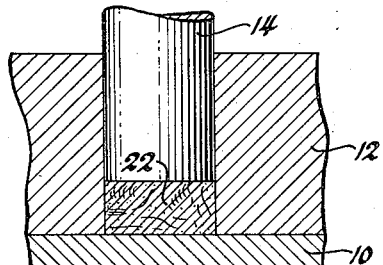
Figure 2 is a section corresponding to Figure 1 showing the parts as they appear at the end of the pressing.

Figure 2 shows the position of the die parts when pressing has been completed and the article 22 is roughly shaped. This operation is preferably performed without applying any heat to the dies although, of course, the heavy pressure will generate heat. If desired, provision may be made for heating the dies.

Following this the shaped article is heated to a sintering temperature. In the case of iron and steel this temperature should be in the neighborhood of 2000 to 2050° F.

Figure 3:
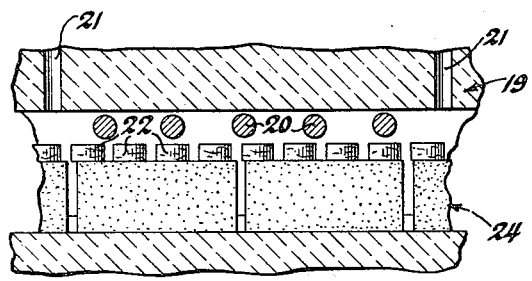
Figure 3 is a diagrammatic sectional view showing the roughly shaped articles passing through a sintering furnace.

In Figure 3 there is shown a sintering furnace 19 heated in any suitable manner as by electrical heating elements 20 and preferably provided with a protecting atmosphere, such as hydrogen, through conduits 21. The articles 22 may be carried through the furnace on a suitable conveyor 24.

Figure 4:
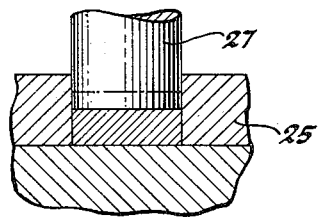
Figure 4 is a section through the press in which the heated articles are subject to a final shaping operation.

The next step consists in pressing the articles to final form. As shown in Figure 4 this may be done by pressing the heated article in the final forming dies 25, 27 and striking to final shape. The final pressing operation may reduce the size of the roughly formed piece in any proportion that may prove desirable. A 25% reduction has been satisfactory in many cases. This has been accomplished by employing pressures on the order of 30 to 50 tons per square inch. Since the metal at this stage is in a plastic condition relatively low forming pressures are sufficient and the pressing may be done as quickly as the press will permit.

Figure 5:
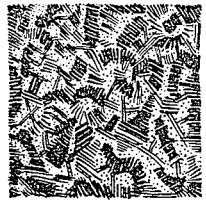
Figure 5 is a reproduction of a photograph of the etched surface of a solid disc made by the process illustrated in Figures 1 to 4. A magnification of four times has been employed.

In Figure 5 is shown a reproduction of a photograph, made with a magnification of four times, of a portion of an etched surface of a steel article made as described. The deformed chips of which it is made are clearly visible. It is practically impossible to detect these outlines in the finished article without etching. The material is non-porous and takes a high polish.

Figure 6:
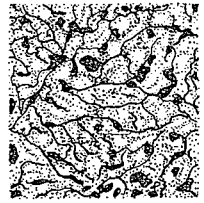
Figure 6 is a similar view of the etched surface of a solid disc made of cast iron chips but with a magnification of one hundred times.

Figure 6 is a photograph made with a magnification of one hundred times of a portion of the surface of an article made of cast iron chips and turnings. The black spots are particles of carbon. The surface of the article appears to be somewhat porous on ordinary inspection but the fractured surface of a broken piece appears to be quite homogeneous and non-porous. The somewhat porous surface may be of advantage for bearings in holding lubricant.

Articles made as described of steel chips, chunks and turnings without any cleaning or other preparation broke under an applied load of 12,700 pounds while articles identical in size and shape made of ordinary cast iron broke under an applied load of 4,800 pounds. The tensile strengths of the two materials are in substantially the same proportions.

Similar articles made of 75% steel chips, chunks and turnings and 25% powdered sponge iron broke under an applied load of 13,400 pounds. Like articles made of 75% cast iron chips and fragments and 25% powdered sponge iron broke under an applied load of 8,200 pounds.

Figure 7:
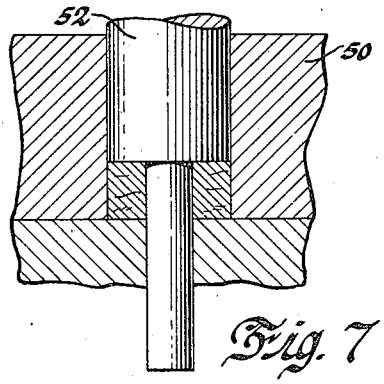
Figure 7 is a section through a suitable press for forming annular articles, one of which is shown in Figure 8.
Figure 8:
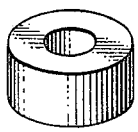

There are shown in Figure 7 suitable dies 50 and 52 for the making of rings or bushings such as shown in Figure 8 by my process. In general, it will be possible to make by this process any articles that can be shaped in dies. Examples are hardware of various sorts, levers, brake drums, containers, covers and so on. Owing to the low price of the chips, chunks and turnings used in manufacture and the great reduction in machining and finishing operations the cost of the final articles should be very greatly reduced as compared with the present methods of manufacture such as casting, drop forging, machining and so on. As pointed out above, articles made by my process are much stronger than articles made of cast iron. A limitation on the application of the method is of course the lower strength of the articles as compared with steel made in the usual ways, but it may prove possible to substantially improve the strength of articles made by my process by proper selection of scrap or scrap and powder used in making them.

Articles made by my method may, of course, be subsequently machined or otherwise fabricated if desired. The strength of articles made as above described may be further increased by reforging, drop forging, rolling or the like.

Figure 9:
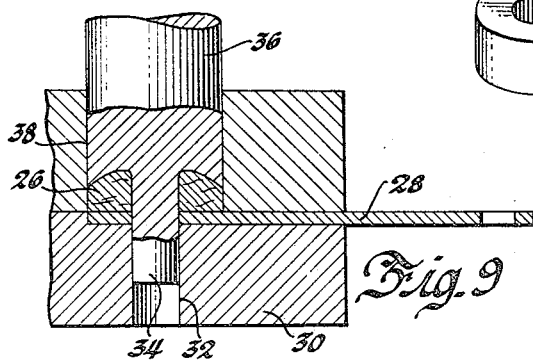
Figure 9 is a section through a press for forming a perforated lug on the end of a bar or strip.

It is also possible to unite by this method sheets, plates, bars or other solid shapes with variously shaped lugs or protuberances of any kind to make strong articles of irregular shape. For example, there is shown in Figure 9 a suitable arrangement of dies for applying a boss 26 of irregular contour to a sheet metal bar or stamping 28. Here 30 indicates the base plate of the press apertured at 32 to receive pilot 34 of die plunger 36 cooperating with cavity 38 in the other member of the die.

By the inserting in the forming dies various parts such as part 28 various combinations of metals may be united and various irregular shapes may be produced. It is understood, of course, that Figure 9 shows the initial forming operation and that this is followed by heating to sintering temperature and striking to final shape while hot.

It has been found that an excellent bond can be obtained between sheet metal and the pieces of metal or metal powder used to make the boss 26.

Obviously, also, the method may be employed to produce articles having different kinds of metal in different parts to fit particular uses. For example, it may be desirable in the case of brake drums to provide cast iron chips or powder on the braking surface and to fill the remainder of the die cavity with steel to secure the requisite strength, or if desired, other metals may be combined with iron or steel or with each other so as to produce products having certain surfaces or portions of one material and other surfaces or portions of another material. It may likewise prove feasible to embody certain alloying metals or constituents which in the final sintering and pressing operations may alloy together. The alloying materials may be confined to particular surfaces or parts of the article.

While it might be anticipated that the use of large fragments of metal might produce excessive die wear, experience so far indicates that no such difficulty is likely to arise. The tool steel dies survive the abrading action of the larger fragments of metal as well as they now survive the abrading action of metal powders or solid stock used in forging or cold pressing.

It is to be understood that the term "fragments" is used in the claims to designate metal consisting predominantly of chips, chunks, turnings and the like as described in the specification.

I claim:

1. The method of making metal articles in finished shape which consists in placing a measured quantity of metal fragments in a mold, forming them under heavy pressure into a substantially solid piece approximating the desired shape but somewhat larger in size, heating the piece in a non-oxidizing atmosphere to sintering temperature and pressing it while hot into finished form in a suitable die.

2. The method of making ferrous metal articles in finished shape which consists in placing a measured quantity of ferrous metal fragments in a mold and uniting them by means of heavy pressure on the order of at least 30 tons per square inch into a substantially solid piece approximating the shape of the final article but somewhat larger in size, heating the formed article to sintering temperature in a non-oxidizing atmosphere and pressing it, while hot, to final shape in a suitable die.

3. The method of making ferrous metal articles in finished form which consists in placing a measured quantity of ferrous metal fragments in a mold and uniting them by means of pressure on the order of 30 tons per square inch into a solid piece approximating the shape of the final article but somewhat larger, heating the formed article to a temperature on the order of 2000° F., placing it in a suitable die, and striking it while hot to reduce it to final shape.

4. The method of making ferrous metal articles in finished form which consists in placing a measured quantity of ferrous metal fragments in a mold and uniting them by means of pressure on the order of 30 tons per square inch into a solid piece approximating the shape of the final article but somewhat larger in size, heating the formed article to temperatures on the order of 2000° F. and subjecting the article while hot to heavy pressure on the order of 30 tons per square inch to reduce it to finished shape.

5. The method of making metal articles of cast iron which consists in filling a mold with fragments of cast iron, applying heavy pressure thereto to roughly form an article, heating the roughly shaped article to sintering temperature in a non-oxidizing atmosphere, placing the heated article in a suitable die, and reducing the article to finished shape by applying heavy pressure thereto.

6. The method of making articles of cast iron which consists in filling a mold with metal fragments consisting predominantly of cast iron, applying heavy pressure thereto on the order of 30 tons per square inch, to roughly shape the article, heating the roughly shaped article to a sintering temperature on the order of 2000° F., in a non-oxidizing atmosphere, and reducing the article to final shape in a suitable die by means of heavy pressure.

7. The method of forming a composite metal article which consists in inserting in a suitable mold a fabricated metal blank, filling the mold with a measured quantity of metal fragments, applying heavy pressure to the metal in the mold to cause the fragments to unite with each other and with the blank to form a substantially solid article having roughly the shape desired, heating the roughly shaped article to sintering temperature, inserting the heated article in a suitable die, and applying heavy pressure thereto to form it into final shape.

8. The method of forming a composite metal article of steel and cast iron which consists in inserting in a suitable mold superposed layers of cast iron fragments and of steel fragments, applying heavy pressure to the fragments in the mold to cause them to unite into a substantially solid article having roughly the desired shape, heating the roughly shaped article to sintering temperature, placing the heated article in a suitable die, and applying heavy pressure thereto to reduce it to final shape, the finished article having in one portion thereof the characteristics of cast iron and in another portion thereof the characteristics of steel.

9. An article made of cast iron and characterized by strength substantially in excess of that of the virgin cast metal, formed by sintering together under heat and heavy pressure fragments of cast iron.

10. A laminated ferrous article comprising superposed layers of steel and of cast iron the latter layer being formed by sintering together into a dense, strong body, by means of heat and heavy pressure fragments of cast iron.

11. A laminated metal article comprising superposed integrally united layers of steel and cast iron, each of said layers being formed by sintering together into a dense, strong body fragments of the respective materials by means of heat and heavy pressure.

HERMAN TORMYN.